(12) United States Patent
Fulga et al.

(10) Patent No.: US 7,394,505 B2
(45) Date of Patent: Jul. 1, 2008

(54) HIGH LINEARITY, LOW NOISE FIGURE TUNER FRONT END CIRCUIT

(75) Inventors: Stefan Fulga, Ottawa (CA); Adrian Gradinaru, Nepean (CA); David Rahn, Kanata (CA)

(73) Assignee: SiGe Semiconductor Inc., Ottawa, Ontario (CA)

( * ) Notice: Subject to any disclaimer, the term of this patent is extended or adjusted under 35 U.S.C. 154(b) by 1535 days.

(21) Appl. No.: 10/076,550

(22) Filed: Feb. 19, 2002

(65) Prior Publication Data

US 2003/0159156 A1     Aug. 21, 2003

(51) Int. Cl.
*H04N 5/50*    (2006.01)
*H04N 5/44*    (2006.01)

(52) U.S. Cl. .................. 348/731; 348/725; 725/151

(58) Field of Classification Search ......... 348/731–733, 348/725; 725/68, 85, 100, 114, 131, 138, 725/139, 144, 151; *H04N 5/50, 5/44*
See application file for complete search history.

(56) References Cited

U.S. PATENT DOCUMENTS 6,487,419 B1 *  11/2002  Freed .................. 455/522

* cited by examiner

*Primary Examiner*—Sherrie Hsia
(74) *Attorney, Agent, or Firm*—Freedman & Associates

(57) ABSTRACT

A cable tuner front end circuit is disclosed for receiving a radio frequency television input signal and for selectively amplifying the signal in dependence upon a predetermined level of the tuner circuit output signal. The tuner front end circuit having first and second radio frequency paths, wherein dependence upon the predetermined level of the output signal, the input signal either propagating along the first path without amplification or the input signal propagating along the second path with low noise amplification. Such that, when amplification is not required the amplifier circuit is disabled thereby offering a savings in tuner circuit power consumption.

29 Claims, 5 Drawing Sheets

HIGH LINEARITY, LOW NOISE FIGURE TUNER FRONT END CIRCUIT

FIELD OF THE INVENTION

The field of the invention relates to radio frequency tuners and more specifically in the area of analog or digital cable TV tuner front ends.

BACKGROUND OF THE INVENTION

Television and data signals travel over coaxial cable. These signals are transmitted as radio frequency (RF) signals, and are approximately in the range of 50 MHZ to over 860 MHz. These RF signals are either analog or digital in nature, and tuner circuits are used for tuning into one of the channels within the RF signal. They typically require low distortion, low noise figure, low phase noise, 2nd and 3rd order filters. Filtering by the filters is required over the entire dynamic range of the approximately 10 dB RF input signal range. Desensitization of the filter, due to interference, also needs to be kept at a minimum. Ideally prior to filtering, a low noise figure front-end provides amplification of the RF signal prior to tuning. In U.S. Pat. No. 6,100,761 a low noise amplifier circuit is disclosed which can handle a wide frequency range as well as provide a wide amplification range.

Unfortunately, filters that provide 2nd and 3rd order filtering over this wide dynamic range suffer from a tradeoff between speed and power consumption. In order to handle broadband signals the tuner requires more power since a faster, more linear, circuit is required, where faster circuits consume more power and slower circuits consume less. Consequently, as the bandwidth for TV and data signals increases, the power consumption of the tuners increases. High linearity is needed for high bandwidth operation within the frequency band This increases heat dissipation and therefore is undesirable. It is also undesirable due to newer applications for tuners requiring lower power consumptions, such as telephone signal transmission via television cable networks.

It is therefore an object of this invention to provide a tuner circuit which offers a highly linear output signal having a low noise figure at low signal levels while advantageously keeping tuner power consumption to a minimum.

SUMMARY OF THE INVENTION

In accordance with the invention there is provided a television cable tuner front end comprising:
a front end input port for receiving an input signal;
a front end output port; a first radio frequency path electrically coupled to the front end input port;
a second radio frequency path electrically coupled to the front end input port;
a first mixer circuit having a first input port, a first output port and a second input port and disposed within the first radio frequency path for receiving the input signal at the first input port, an oscillating signal at the second input port, and for providing a first output signal at the first output port thereof;
a low noise amplifier circuit having an input port and an output port and disposed within the second radio frequency path for in a first mode of operation receiving the input signal at the front end input port, for amplifying the input signal within a predetermined frequency band, and for providing an amplified signal at the output port thereof, and in a second mode of operation for other than amplifying the input signal; and,
a second mixer circuit having a first input port, a first output port and a second input port and disposed within the second radio frequency path for in the first mode of operation receiving the amplified signal at the first input port, an oscillating signal at the second input port, and for providing a second output signal at the first output port thereof,
wherein the first output signal and the second output signal are selectably coupled to the front end output port.

In accordance with another aspect of the invention there is provided a television cable tuner front end comprising:
a front end input port for receiving an input signal;
a front end output port; a first radio frequency path electrically coupled for receiving a signal from the front end input port;
a second radio frequency path electrically coupled for receiving a signal from the front end input port;
a first variable attenuator circuit disposed within the first radio frequency path and having an input port, electrically coupled to the first output port, and an output port for providing a first attenuated signal;
a low noise amplifier circuit having an input port, coupled to the second output port, an output port, and disposed within the second radio frequency path for providing an amplified signal; and,
a mixer circuit having a first input port, a second input port, and an output port, the mixer circuit first input port coupled to the summing circuit output port, the mixer circuit output port for providing an output signal to the front end output port, and the second input port for receiving an oscillating signal from an oscillator source.

In accordance with yet another aspect of the invention there is provided a method of controlling a television cable tuner front end having a front end input port comprising the steps of:
receiving an input signal at the front end input port;
providing a low noise amplifier circuit electrically coupled to the front end input port;
when the input signal is above a predetermined threshold signal amplitude mixing the signal without further amplification with a local oscillator signal; and,
when the input signal is below the predetermined threshold signal amplitude providing the signal to the low noise amplifier circuit for amplification before attenuation and mixing thereof.

BRIEF DESCRIPTION OF THE DRAWINGS

The invention will now be described with reference to the drawings in which.

DETAILED DESCRIPTION OF THE INVENTION

Figure 1:
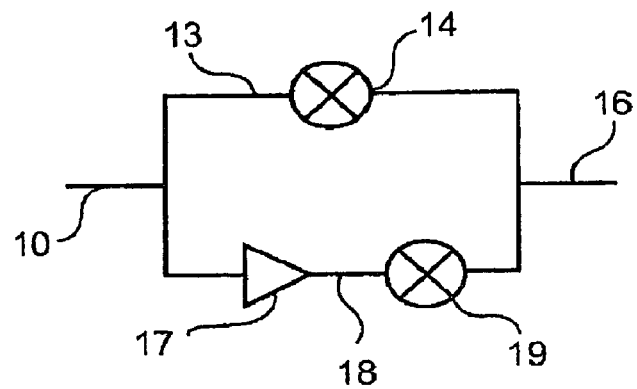
FIG. 1 illustrates a first embodiment of the invention, a constant gain dual mode front-end circuit.
Figure 2:
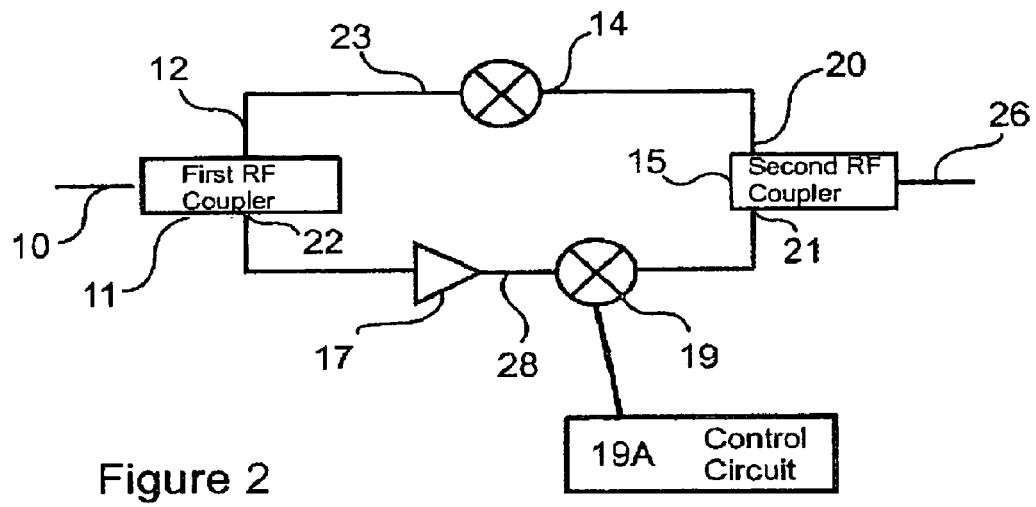
FIG. 2 illustrates a variation of the constant gain dual mode front-end circuit.

FIG. 1 illustrates a first embodiment of the invention, a constant gain dual mode front-end circuit, having, a front end input port 10 and a front end output port 16. A first RF path 13 is disposed between the front end input port and the front end output port, where within the first RF path 13 a first mixer circuit 14 is disposed. A second RF path 18 is also disposed between the front end input port and the front end output port, in parallel with the first RF path. Where within the second RF path, in proximity of the front end input port 10 a low noise amplifier circuit (LNA) 17 in series with a second mixer FIG. 2 illustrates a variation of the constant gain dual mode front-end circuit. A front end input port 10 is coupled to a first RF coupler 11. The first RF coupler 11, having two output ports, a first output port 12 coupled to a first RF path 23 further coupled to a second RF coupler 15, first input port 20, where within the first RF path 23 a first mixer circuit 14 is disposed. An output port 26 is provided on the second RF coupler 15 for providing an output signal to the front end output port 26. The second output port 22 of the first RF coupler 11 coupled to the second RF coupler 15 second input port 21 via a second RF path 28, in parallel with the first RF path 23. Where within the second RF path, in proximity of the first RF coupler 11, second output port 22, a low noise amplifier circuit (LNA) 17 is disposed, in line with a second mixer circuit 19 and coupled thereto. The output port of each of the two paths is coupled together, either in a direct fashion.

Using the constant gain dual mode front-end circuit depicted in FIG. 1, output signal linearity at high RF input signal levels and a low noise figure at low RF input signal levels, are achieved by powering up or down of components disposed in either the first RF path or the second RF path. Powering down of electronic components disposed in either the first RF path or the second RF path provides for sufficient isolation, such that a majority of power in the RF input signal propagates in the path having at least an active element. As shown a control circuit 19A is electrically connected to the second mixer 19 allowing the selective powering down of the second RF path. The active element being either the mixer or the LNA, where active is meant to imply powered up and operating, other than inactive. The first mixer 14 is a high linearity device.

The second RF path 28 has a low noise figure because of a high gain of the LNA. During or approximately about time of switching signal propagation between paths, the gains for the first RF path and the second RF path are approximately equal, or only 1 to 2 dB apart, which allows for switching the RF input signal between the first and the second RF paths, via powering up or down of components disposed within either path, without a significant change in power level of the input signal after having propagated on said path. Preferably, when switching from the first RF path to the second RF path the gain of the first RF path and the gain of the second RF path are approximately equal.

Figure 3:
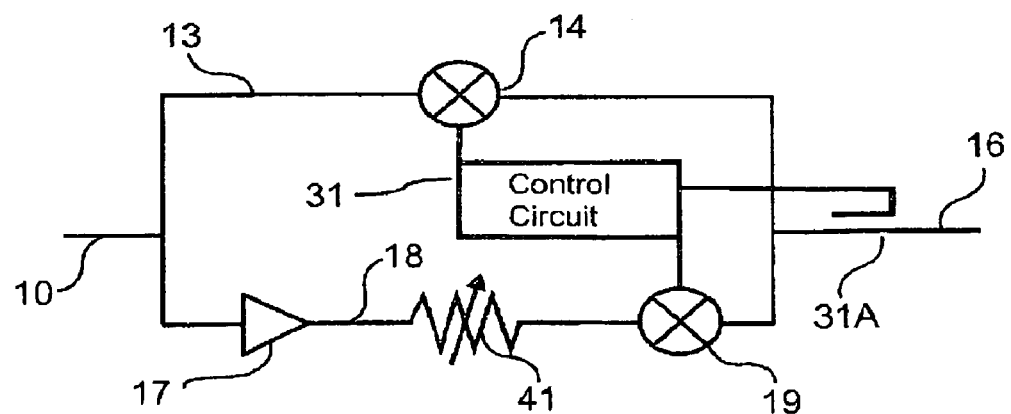
FIG. 3 illustrates a second embodiment of the invention, a variable gain front-end tuner circuit.

In a second embodiment, shown in FIG. 3, a variable gain front-end tuner is shown, having a front end input port 10 and a front end output port 16. A first RF path 13 is disposed between the front end input port 10 and the front end output port 16, where within the first RF path 13 a first mixer circuit 14 is disposed. A second RF path 18 is also disposed between the front end input port 10 and the front end output port 16, in parallel with the first RF path 13. Where within the second RF path 18, in proximity of the front end input port 10 a low noise amplifier circuit (LNA) 17, in line with a variable attenuator circuit 41 and in line with a second mixer circuit 19, are disposed and coupled therein. The variable attenuator circuit 41 provides controllable attenuation to a portion of the RF input signal propagating along the second RF path 18 after amplification by the LNA 17. As discussed supra in respect of FIG. 2 a control circuit 31 is provided, monitoring the front end output port 16 via coupler 31A, and determining which of the first mixer circuit 14 and second mixer circuit 19 to power down.

Figure 4:
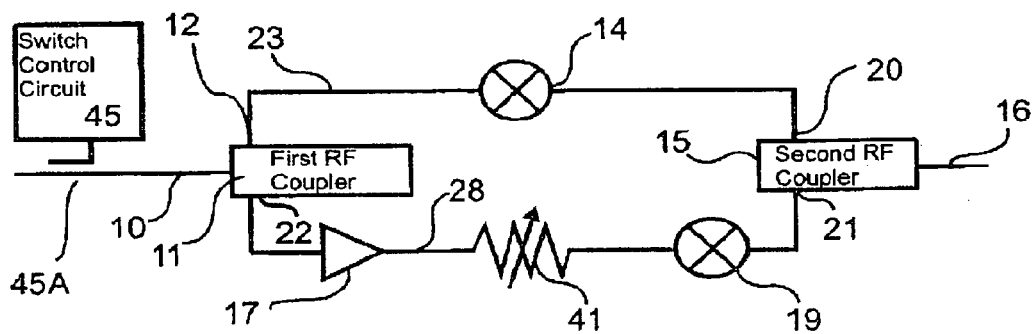
FIG. 4 illustrates a variation of the second embodiment.

FIG. 4 illustrates a variation of the second embodiment, where in this variation the front end input port 10 is coupled to a first RF coupler 11. The first RF coupler 11, having two output ports, a first output port 12 coupled to a first RF path 23, where the first RF path is further coupled to a second RF coupler 15, first input port 20, where within the first RF path 23 a first mixer circuit 14 is disposed. Also disposed on front end input port 10 is tap coupler 45A which provides a tapped portion of the input signal to a switch control circuit 45. The switch control circuit 45 being electrically connected to first RF coupler 11 and controlling this in dependence upon the tapped portion of the input signal. An output port 16 is provided on the second RF coupler 15 for providing an output signal to the front end output port 16. The second output port 22 of the first RF coupler 11 coupled to the second RF coupler 15, second input port 21 via a second RF path 28, in parallel with the first RF path 23. Where within the second RF path 28, in proximity of the front end input port 10 a low noise amplifier circuit (LNA) 17, in line with a variable attenuator circuit 41 and in line with a second mixer circuit 19, are disposed and coupled therein. The variable attenuator circuit 41 provides controllable attenuation to a portion of the RF input signal propagating along the second RF path 28 after amplification by the LNA 17. Typically, attenuating a signal prior to amplification decreases a signal to noise ratio of the signal and is therefore not advantageous. Alternatively first RF coupler 11 rather than being an electrically variable coupler may be replaced with an RF switch.

Figure 5:
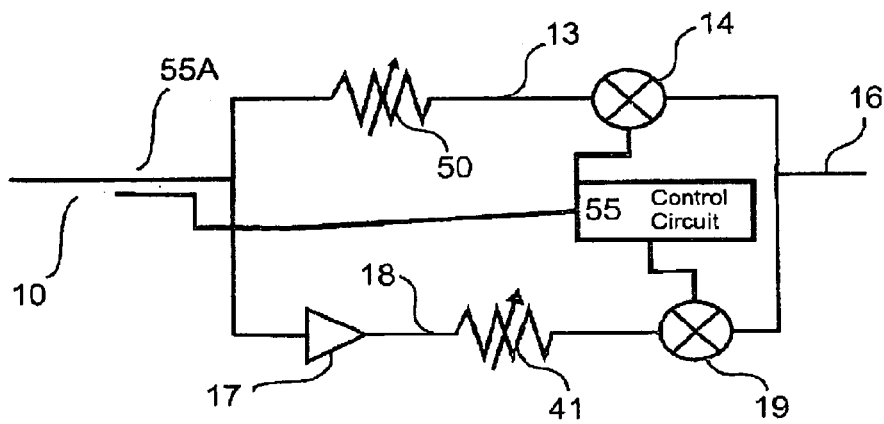
FIG. 5 illustrates the front end tuner circuit shown in FIG. 3 with an additional attenuator circuit.

FIG. 5 illustrates the front end tuner circuit shown in FIG. 3, however a second attenuator circuit 50 is additionally disposed within the first radio frequency path, the second attenuator circuit having an input port coupled to the front end input port 10, and an output port coupled to the first mixer circuit 14 input port. The second variable attenuator circuit 50 for providing controllable attenuation to an input signal received at the input port, prior to providing a second attenuated signal to the first mixer circuit 14. Also disposed on the front end input port 10 is tap coupler 55A which provides a tapped portion of the input signal to a control circuit 55 which is electrically connected to both first mixer circuit 14 and second mixer circuit 19. The control circuit 55 thereby determining which of the first mixer circuit 14 and second mixer circuit 19 to power down.

Figure 6:
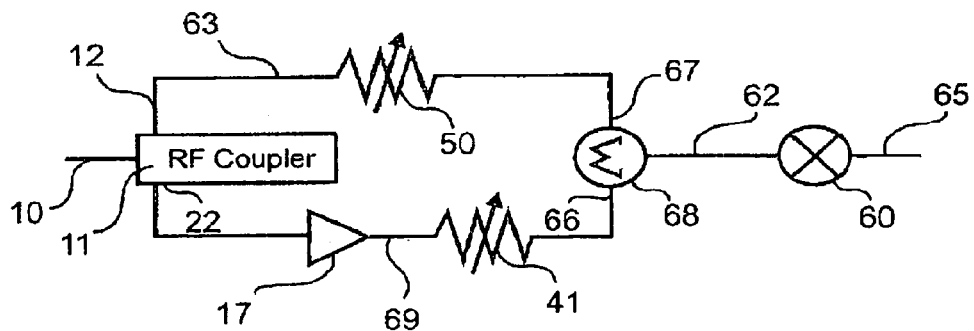
FIG. 6 illustrates a variation of the embodiment shown in FIG. 4.

FIG. 6 illustrates a variation of the embodiment shown in FIG. 4, where in this variation the front end input port 10 is coupled to a first RF coupler 11. The first RF coupler 11, having two output ports, a first output port 12 coupled to a first RF path 63, where the first RF path is further coupled to a summing circuit 68 first input port 67, where within the first RF path 63 a second attenuator circuit 50 is disposed. The summing circuit 68 output port 62 is coupled to a mixer circuit 60 input port, and the mixer circuit 60 output port is for providing an output signal to the front end output port 65. The second output port 22 of the first RF coupler 11 coupled to the summing circuit 68 second input port 66. Where within the second RF path 69, in proximity of the front end input port 10 a low noise amplifier circuit (LNA) 17, in line with a variable attenuator circuit 41 are disposed and coupled thereto. The variable attenuator circuit 41 provides controllable attenuation to a portion of the RF input signal propagating along the second RF path 69 after amplification by the LNA 17. Mixer circuits additionally comprise an input port for receiving of an oscillating electrical signal from a local oscillator source (not shown). Advantageously the summing circuit provides for a high impedance return path, effectively blocking of an RF signal propagating along the second RF path from propagating along the first RF path when the components in first RF path are other than enabled, as well as high impedance blocking of an RF signal propagating along the first RF path from propagating along the second RF path when the components in second RF path are other than enabled.

Figure 7:
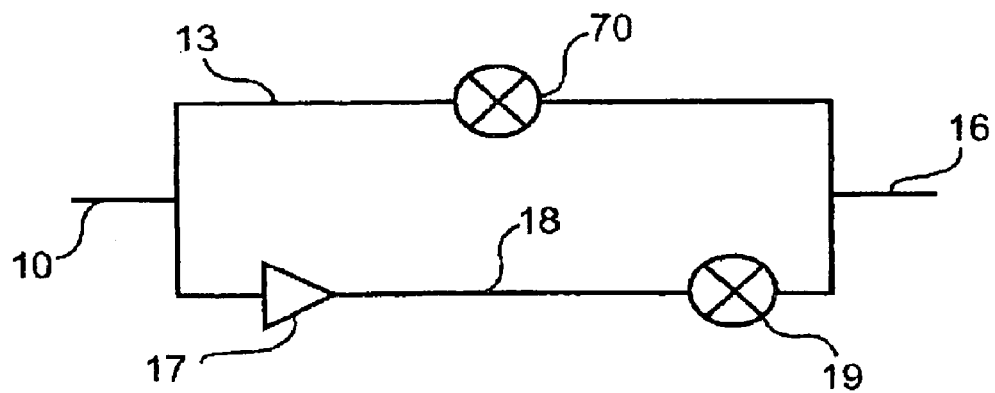
FIG. 7 illustrates a variation on the first embodiment of the invention.

FIG. 7 illustrates a variation on the first embodiment of the invention, having, a front end input port 10 and a front end output port 16. A first RF path 13 is disposed between the front end input port and the front end output port, where within the first RF path 13 an amplifying mixer circuit 70 is disposed. A second RF path 18 is also disposed between the front end input port 10 and the front end output port 16, in parallel with the first RF path 13. Where within the second RF path 18, in proximity of the front end input port 10 a low noise amplifier circuit (LNA) 17 is disposed in series with a second mixer circuit 19.

Figure 8:
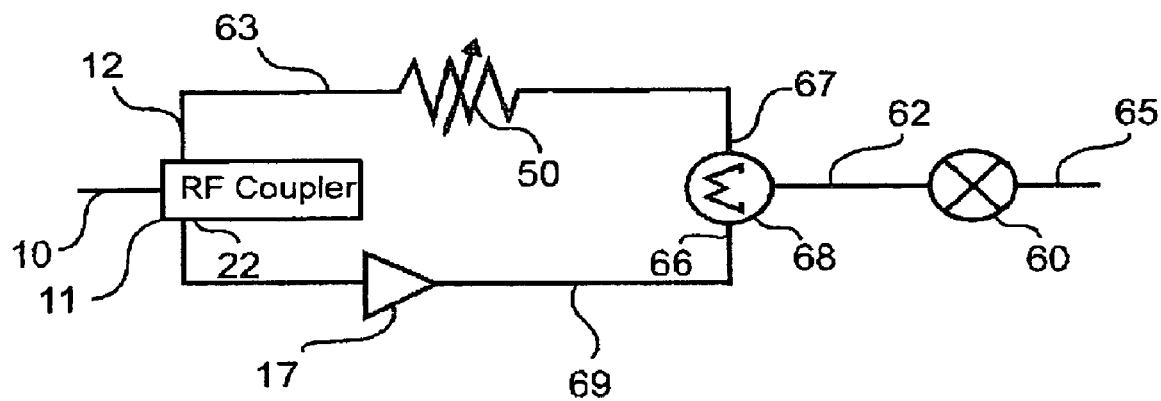
FIG. 8 illustrates a variation of the embodiment shown in FIG. 6.
Figure 9:
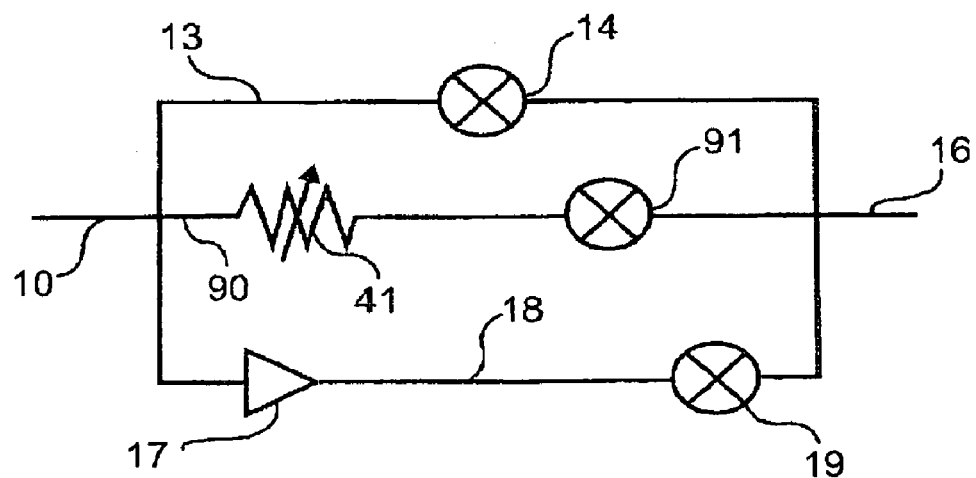
FIG. 9 illustrates an addition to the embodiment shown in FIG. 1, where a third RF path is disposed in parallel with first and second RF paths.

In FIG. 8, a variation of the embodiment shown in FIG. 6 is illustrated, where in this variation no variable attenuator circuit 41 is disposed in the second the second RF path 69. In FIG. 9, in addition to the embodiment shown in FIG. 1, a third RF path 90 is disposed in parallel with the first and second RF paths. The third RF path 90 is disposed between the front end input port 10 and the front end output port 16, where within the third RF path 90 a variable attenuator circuit 41 in series with a third mixer circuit 91, is provided.

Figure 10:
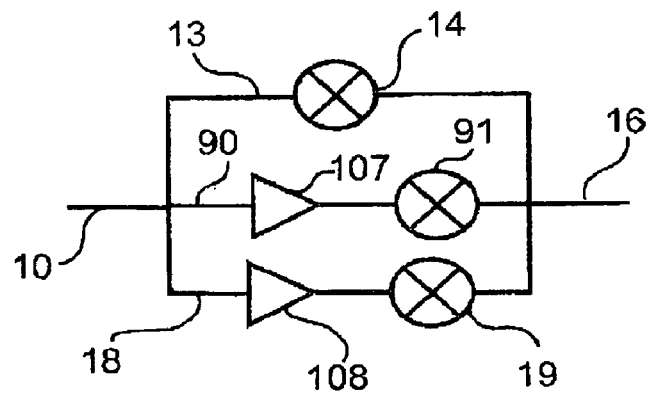
FIG. 10 illustrates three RF paths that are disposed in parallel.

In FIG. 10, three RF paths are disposed in parallel from the front end input port 10 to the front end output port 16. In the first RF path 13 a mixer circuit 14 is disposed. In the third RF path 90 a low noise amplifier 107, having a small gain, is disposed in series with a third mixer circuit 91. In the second RF path 18, a low noise amplifier 108, having a large gain, is disposed in series with a second mixer circuit 19.

Figure 11:
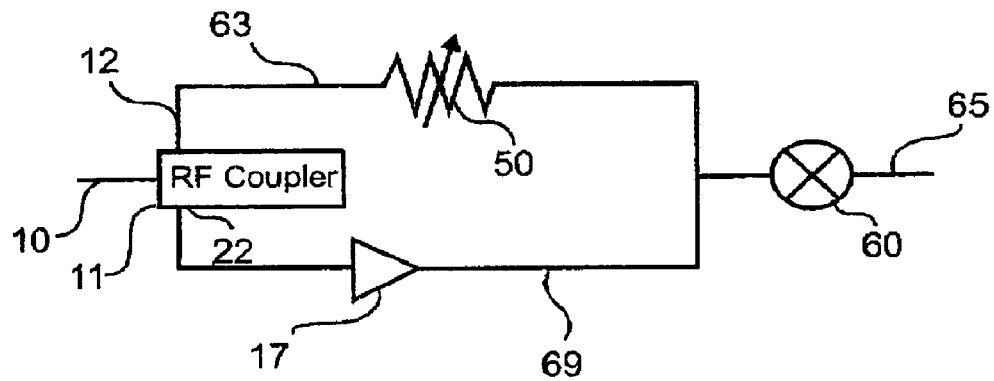
FIG. 11 is a variation of the embodiment shown in FIG. 8.
Figure 12:
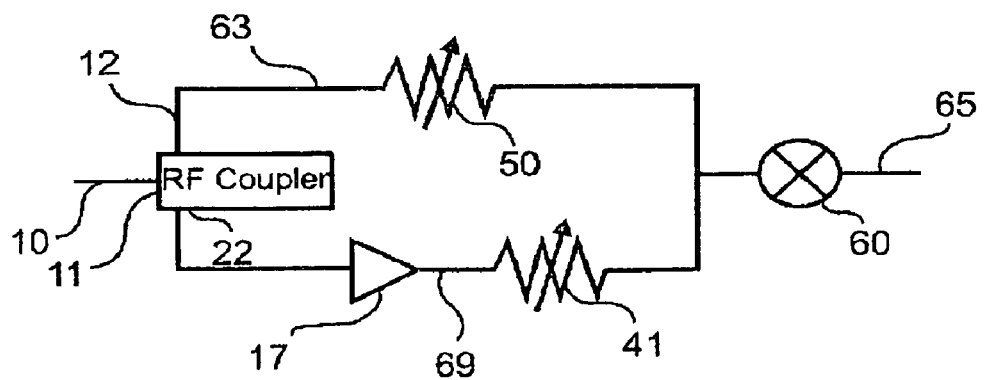
FIG. 12 illustrates a variation of the embodiment shown in FIG. 6.
Figure 13:
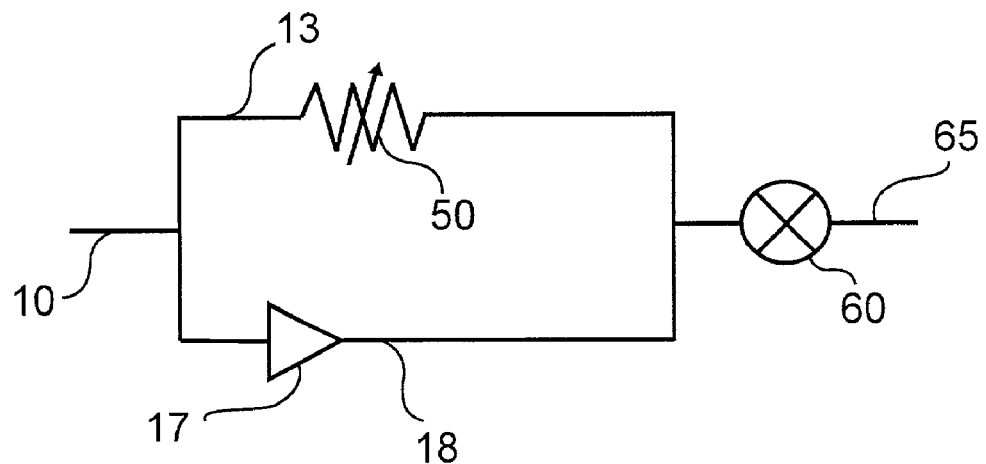
FIG. 13 is a further variation of the embodiment shown in FIG. 11.
Figure 14:
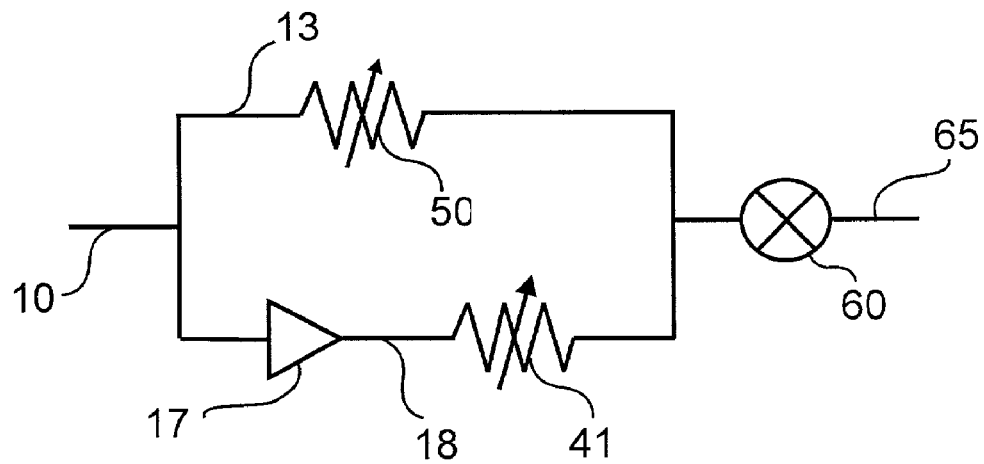
FIG. 14 is a further variation of the embodiment shown in FIG. 12.

FIG. 11 is a variation of the embodiment shown in FIG. 8, where the summing circuit 68 has been removed, resulting in the first RF path coupling to the second RF path, coupling into a mixer circuit 60 input port. FIG. 12 illustrates a variation of the embodiment shown in FIG. 6, where the summing circuit 68 has been removed, resulting in the first RF path coupling to the second RF path, coupling into a mixer circuit 60 input port. FIG. 13 is a further variation of the embodiment shown in FIG. 11, where the first RF coupler 11 has been removed and the front end input port 10 is coupled into the first RF path and the second RF path. FIG. 14, is a further variation of the embodiment shown in FIG. 12, where the first RF coupler 11 has been removed and the front end input port 10 is coupled into the first RF path and the second RF path. It is preferred that each RF path presents a high impedance to the mixer input port when components in that path are disabled in order to prevent unwanted noise from propagating within the circuit and to prevent any effects circuitry within disabled components may have on the signal such as voltage division, paths to ground, etc. Of course, presenting a high impedance to the mixer input port also prevents signals from propagating backwards into disabled components thereby maintaining the functionality of the overall device.

In use, using the variable gain front-end tuner, such as that depicted in FIG. 3, output signal linearity at high RF input signal levels and a low noise figure at low RF input signal levels, are achieved by powering up or down of components in either the first RF path 13 or the second RF path 18. Powering down of active elements in either the first RF path 13 or the second RF path 18 provides for sufficient isolation, such that a majority of power in the RF signal propagates in the path having at least an element active. The second RF path 18 has a low noise figure because of a high gain of the LNA.

In use, as the RF input signal decreases in intensity to below a predetermined threshold, the variable gain front-end tuner circuit enables propagation of a portion of the RF input signal along the second RF path. In the second RF path the attenuator is initially set to have a minimal attenuation, such that the there is a small overall gain difference between the first and the second RF paths. As the RF input signal continues to decrease in power, the attenuation of the attenuator is decreased such that a maximum sensitivity and minimum noise figure are achieved for a portion of the RF input signal propagating along the second RF path 39. Varying attenuation of the attenuator allows for a minimal loss to be present between the first and the second RF paths during a transition between having the input RF signal propagating along the first RF path or the second RF path.

The variable attenuator 41, 50, is also in the form of a digitally controllable attenuator, and for example is variable in 1 dB power increments. Advantageously, using the circuit in the second embodiment, the gain of the front-end is low at high RF input signal levels and goes up as the input signal decreases. This being indicative of less stringent linearity requirements placed on second mixer 19.

Advantageously, in any of the embodiments, by powering down of the LNA while a portion of the RF input signal is propagating along the first RF path 13,23,63, affords a power savings in power consumption for the tuner circuit since the LNA is powered down and is not consuming electricity. In operation the LNA typically consumers in the order of 20% from a total tuner operating current, and therefore disabling the LNA when not required affords a 20% savings in tuner circuit power consumption. The LNA is powered up once the portion of the RF input signal propagating along the first RF path decreases to below a predetermined threshold, thereby offering amplification to the portion of the RF input signal propagating along the second RF path. Once the portion of the RF input signal propagating along the second RF path increase in power to above the predetermined threshold, components disposed within the first RF path are enabled and components disposed within the second RF path are disabled, thereby offering a power savings.

Of course, instead of enabling or disabling elements in either the first 13 or the second 18 RF path, the first and second RF couplers 11 21 are replaced with first and second RF switches, respectively, thereby allowing for switching of the RF input signal into either path.

Offering low tuner circuit power consumption by disabling components in either of the first or the second RF paths when not used yields lower tuner circuit power consumption and is therefore advantageous; providing a tuner circuit having low power consumption and low voltage requirements. When elements within the first or the second RF paths are disabled, the elements offer sufficient isolation, as that provided by RF switches, and therefore RF switches are not required.

Of course circuits shown in any of the embodiments are single, dual and three path circuits, however if for instance a finer gain difference between radio frequency paths is required then additional paths are disposed between the front end input port and the front end output port to provide the finer gain difference.

Numerous other embodiments may be envisaged without departing from the spirit or scope of the invention.

What is claimed is:

1. A television cable tuner front end comprising:
   a front end input port for receiving an input signal;
   a front end output port;
   a first radio frequency path electrically coupled to the front end input port;
   a second radio frequency path electrically coupled to the front end input port;
   a first mixer circuit having a first input port, a first output port and a second input port and disposed within the first radio frequency path for receiving the input signal at the first input port, an oscillating signal at the second input port, and for providing a first output signal at the first output port thereof;
   a low noise amplifier circuit having an input port and an output port and disposed within the second radio frequency path for in a first mode of operation receiving the input signal at the front end input port, for amplifying the input signal within a predetermined frequency band, and for providing an amplified signal at the output port thereof, and in a second mode of operation for other than amplifying the input signal; and,
   a second mixer circuit having a first input port, a first output port and a second input port and disposed within the second radio frequency path for in the first mode of operation receiving the amplified signal at the first input port, an oscillating signal at the second input port, and for providing a second output signal at the first output port thereof,
   wherein the first output signal and the second output signal are selectably coupled to the front end output port.

2. A television cable tuner front end according to claim 1, comprising: a power control circuit electrically coupled to the second mixer, the power control circuit for turning off the second mixer in the second mode of operation.

3. A television cable tuner front end according to claim 1, comprising: a control circuit electrically coupled to the front end output port and receiving a level signal generated in dependence of a magnitude of the one of the first output signal and the second output signal selectably coupled to the front end output port, the control circuit for disabling one of the first radio frequency path and the second radio frequency path in dependence of the level signal.

4. A television cable tuner front end according to claim 3, comprising:
   a first variable attenuator circuit disposed within the second radio frequency path comprising an input port electrically coupled to an output port of the low noise amplifier circuit, an attenuator control port for receiving an attenuator control signal, and an output port electrically coupled to an input port of the second mixer circuit, the first variable attenuator attenuating the amplified signal received from the low noise amplifier circuit in dependence of the attenuator control signal, and providing the attenuated amplified signal to the second mixer circuit.

5. A television cable tuner front end according to claim 4, wherein the first variable attenuator circuit is controllable in attenuation in steps of 1 dB.

6. A television cable tuner front end according to claim 5, wherein the attenuator control signal is digital and controls the attenuation in steps of 1 dB.

7. A television cable tuner front end according to claim 4, comprising: a second variable attenuator circuit having an input port electrically coupled to receive the input signal, a power control port for receiving a power control signal, and an output port electrically coupled to an input port of the first mixer circuit, the second variable attenuator for controllably attenuating the input signal in dependence of the power control signal.

8. A television cable tuner front end according to claim 1, comprising: a control circuit electrically coupled to the front end input port and receiving an amplitude signal generated in dependence of an amplitude of the input signal, the control circuit for disabling one of the first radio frequency path and the second radio frequency path in dependence of the amplitude signal.

9. A television cable tuner front end according to claim 1, comprising:
   a gating circuit for other than enabling electrical components disposed in either the first or the second radio frequency paths in dependence upon an amplitude of the input signal.

10. A television cable tuner front end according to claim 9, wherein a gain difference between the first radio frequency path and the second radio frequency path during a transition from the first mode to the second mode is less than 2 dB.

11. A television cable tuner front end according to claim 10, wherein a gain difference between the first radio frequency path and the second radio frequency path during a transition from the first mode to the second mode is approximately zero.

12. A television cable tuner front end according to claim 1, wherein the front end input port is switchably coupled to either the first radio frequency path or the second radio frequency path.

13. A television cable tuner front end according to claim 1, wherein the first mixer circuit comprises an amplifier circuit for amplifying a signal propagating from the first mixer first input port to the first mixer first output port.

14. A television cable tuner front end comprising:
   a front end input port for receiving an input signal;
   a front end output port;
   a first radio frequency path electrically coupled for receiving electrical signals from the front end input port;
   a second radio frequency path electrically coupled for receiving electrical signals from the front end input port;
   a first variable attenuator circuit disposed within the first radio frequency path and having an input port, electrically coupled to the front end input port, and an output port for providing a first attenuated signal;
   a low noise amplifier circuit having an input port, coupled to the front end input port, an output port, and disposed within the second radio frequency path for providing an amplified signal; and,
   a mixer circuit having a first input port, a second input port, and an output port, the mixer circuit first input port coupled for receiving to first attenuated signal and to amplified signal, the mixer circuit output port for providing an output signal to the front end output port, and the second input port for receiving an oscillating signal from an oscillator source, wherein electrical signals within one and only one of the first radio frequency path and the second radio frequency path are enabled for provision to the mixer circuit.

15. A television cable tuner front end according to claim 14, comprising a switch having an input port coupled to the front end input port, a first output port coupled to the first radio frequency path and a second output port coupled to the second radio frequency path.

16. A television cable tuner front end according to claim 15, comprising:
   a control circuit electrically coupled to the front end input port and receiving an amplitude signal generated in dependence of an amplitude of the input signal, the control circuit for switching the switch in order to electrically couple the input signal to one of the first radio frequency path and the second radio frequency path.

17. A television cable tuner front end according to claim 15, wherein the attenuator circuit and the amplifier circuit each include circuitry for presenting a high impedance to the first input port of the mixer circuit when a switchably selectable element is in a state to provide electrical signals to the other of the attenuator circuit and the amplifier circuit.

18. A television cable tuner front end according to claim 14, wherein the attenuator circuit and the amplifier circuit include circuitry for presenting a high impedance to the first input port of the mixer circuit when the electrical signals are provided from the other of the attenuator circuit and the amplifier circuit.

19. A television cable tuner front end according to claim 18, comprising a control circuit responsive to an amplitude of a signal received at the front end input port for disabling circuitry within at least the amplifier circuit for selectably blocking signals propagating within one of the first and second radio frequency path.

20. A television cable tuner front end according to claim 14, comprising:
   a second variable attenuator circuit disposed within the second radio frequency path.

21. A television cable tuner front end according to claim 14, comprising
   a summing circuit having a first input port, a second input port, and an output port, the summing circuit first input port for receiving the first attenuated signal, the summing circuit second input port for receiving the amplified signal,
   wherein the first input port of the mixer circuit is electrically coupled to the summing circuit output port.

22. A television cable tuner front end according to claim 21, comprising:
   a second variable attenuator circuit disposed within the second radio frequency path and having an input port, electrically coupled to the low noise amplifier output port, and an output port for providing a second attenuated signal to the summing circuit second input port.

23. A television cable tuner front end according to claim 21, comprising:
   a switch having an input port coupled to the front end input port, a first output port coupled to the first radio frequency path and a second output port coupled to the second radio frequency path; and,
   a control circuit electrically coupled to the front end input port and receiving an amplitude signal generated independence of an amplitude of the input signal, the control circuit for switching the switch in order to electrically couple the input signal to one of the first radio frequency path and the second radio frequency path.

24. A television cable tuner front end according to claim 23, wherein the first variable attenuator circuit is controllable in attenuation in steps of 1 dB.

25. A television cable tuner front end according to claim 14 comprising: an amplifier circuit electrically coupled to the first input port of the mixer circuit, the amplifier circuit for receiving and amplifying the one of first attenuated signal and the amplified signal.

26. A method of controlling a television cable tuner front end having a front end input port comprising the steps of:
   receiving a radio frequency signal at the front end input port;
   providing a low noise amplifier circuit electrically coupled to the front end input port;
   when the input signal is above a predetermined threshold signal amplitude mixing the signal without further amplification with a local oscillator signal; and,
   when the input signal is below the predetermined threshold signal amplitude providing the signal to the low noise amplifier circuit for amplification before attenuation and mixing thereof.

27. A method of controlling a television cable tuner front end according to claim 26, wherein if the radio frequency signal is provided directly for the mixing, electrical power is other than provided to the low noise amplifier circuit in order to conserve electrical power.

28. A method of controlling a television cable tuner front end according to claim 27, comprising the step of:
   providing a first radio frequency path coupled to the front end input port;
   providing a second radio frequency path coupled to the front end input port; and,
   wherein the low noise amplifier circuit is disposed within the second path,
   wherein reducing power provided to electrical components disposed within either the first radio frequency path or the second radio frequency path provides high attenuation along the path where electrical components are provided with reduced power.

29. A method according to claim 28, comprising the step of:
   when a measured radio frequency power level is above a predetermined level enabling a mixer circuit disposed within the first radio frequency path and other than enabling the low noise amplifier circuit and a second mixer circuit disposed within the second radio frequency path; and, where when the measured radio frequency power level is below the predetermined level, other than enabling the mixer circuit disposed within the first radio frequency path and enabling the low noise amplifier circuit and the second mixer circuit disposed within the second radio frequency path.

* * * * *